W. STINSON.
Corn Planter.
No. 13,185.
Patented July 3, 1855.
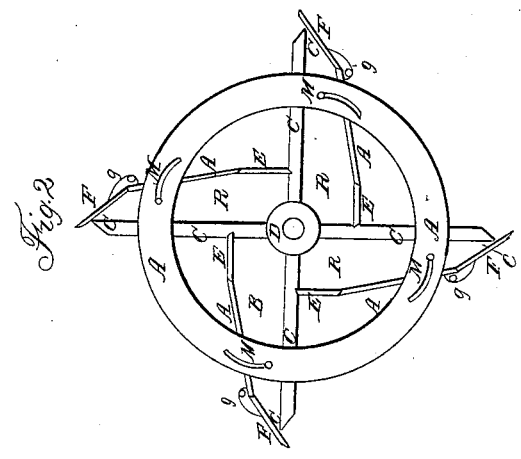
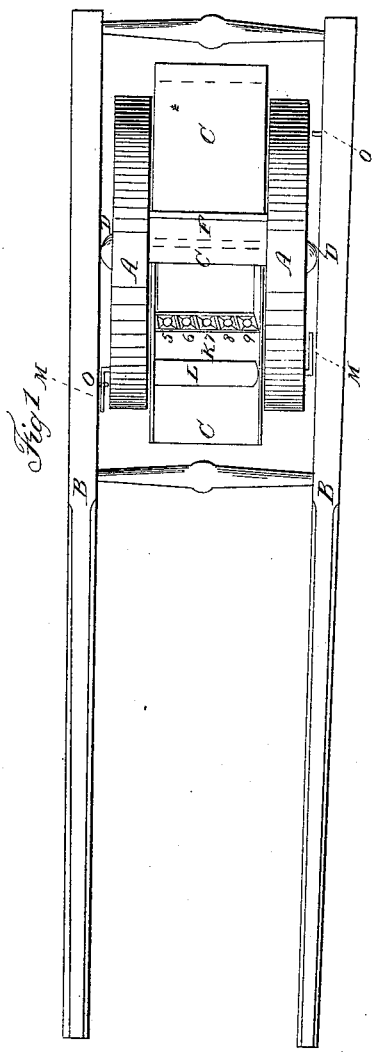
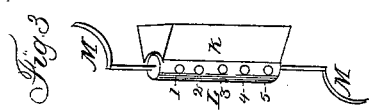

UNITED STATES PATENT OFFICE.

WILLIAM STINSON, OF GEORGETOWN, PENNSYLVANIA.

IMPROVEMENT IN CORN-PLANTERS.

Specification forming part of Letters Patent No. 13,185, dated July 3, 1855.

*To all whom it may concern:*

Be it known that I, WILLIAM STINSON, of Georgetown, Mercer county, State of Pennsylvania, have invented a new and useful Machine for Planting Corn; and I do hereby declare the following to be a full and exact description thereof, reference being had to the accompanying drawings and letters of reference marked thereon.

Figure 1 is a top view of my corn-planter, and Fig. 2 is a side view of the same without the shafts B B.

A A, Figs. 1 and 2, represent the rims of the wheel of my corn-planter, of which there are two, as shown at Fig. 1, constructed about twelve inches apart. These rims are connected together by means of four spokes, C C C C, Fig. 2, and c c c, Fig. 1. The fourth spoke in Fig. 1 cannot be seen.

D D, Fig. 1, is the shaft on which the wheel is constructed.

The spokes c c c c are made of board or plank about a foot wide, and the rims A A are bolted on them securely.

R R R R, Fig. 2, are sides of the corn-boxes, fastened to each spoke, and to the rims of the wheel.

E E E E, Fig. 2, are sliding doors of the corn-boxes, which can be drawn out when the boxes are to be filled with corn.

F F F F, Fig. 2, are spades hung by hinges onto the tops H H H H of the corn-boxes. These spades are kept shut or in the position shown in the drawings by means of the springs I I I I. In each of these corn-boxes there is a trough, K, Figs. 1 and 3. This trough is divided into several compartments, as shown at 5 6 7 8 9, Fig. 1. At the bottom of each is a hole of sufficient size to let a kernel of corn fall through. The outside of the bottom of this trough is made concave to fit the rounded surface of a roller, L. In this roller are holes 1 2 3 4 5, sufficiently large to hold a kernel of corn, and made to correspond with the holes in the bottom of the trough K. On each end of this roller are cranks, turned in opposite directions, as shown at M M, Figs. 1 and 3, and at M M M M, Fig. 2, which shows all the cranks on one side of the planter. These cranks are on the outside of the rims of the wheel, and as the wheel turns they hit the pins O O on the shafts or frame in which the wheel turns, causing the roller to make a semi-revolution backward and forward at every revolution of the wheel, and at every semi-revolution bringing the holes in the roller to correspond with the holes in the trough, and consequently a kernel of corn will be discharged into the holes in each roller at every revolution of the wheel, and as the roller makes a semi-revolution the kernels are dropped down to the point P P P P, and as the wheel turns the spade opens and lets the kernels drop out. The spade is opened by catching in the earth as the wheel revolves, and is shut by the springs I I I I.

It will be seen by reference to the drawings that the ends of the spokes and the spades project beyond the rims of the wheels, and consequently as the wheel turns the spade and end of the spoke will enter the ground and make a hole sufficiently deep to plant the corn. Every spoke has a trough, a roller, a spade, and a corn-box, (although only parts of each are shown in the model and drawings,) and the wheel must be of sufficient diameter to let the distance between the out end of the spades be the proper distance apart for the hills of corn. The wheel may be so constructed as to have three, five, or more spokes, as may be desired.

I am aware that spades similar to mine have been used; but

What I claim, and desire to secure by Letters Patent of the United States, is—

The arrangement of the seed-rollers and corn-box in the spoke of the wheel, in combination with the spade, as set forth.

WM. STINSON.

Witnesses:
A. B. RICHMOND,
J. G. MORRIS.